United States Patent
Steinberger et al.

(10) Patent No.: US 9,303,751 B2
(45) Date of Patent: Apr. 5, 2016

(54) POWER TAKE OFF GEAR WITH A HYDRAULIC IMPACT DAMPER

(71) Applicant: Schaeffler Technologies GmbH & Co. KG, Herzogenaurach (DE)

(72) Inventors: Markus Steinberger, Macedonia, OH (US); Kerry Griffin, Wadsworth, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 190 days.

(21) Appl. No.: 14/148,889

(22) Filed: Jan. 7, 2014

(65) Prior Publication Data

US 2014/0190301 A1     Jul. 10, 2014

Related U.S. Application Data

(60) Provisional application No. 61/749,609, filed on Jan. 7, 2013.

(51) Int. Cl.
| | |
|---|---|
| *F16F 15/167* | (2006.01) |
| *F16F 15/123* | (2006.01) |
| *F16H 55/14* | (2006.01) |

(52) U.S. Cl.
CPC ............ *F16H 55/14* (2013.01); *F16F 15/1236* (2013.01); *F16F 15/167* (2013.01); *Y10T 74/1987* (2015.01)

(58) Field of Classification Search
CPC .............. F16F 15/123; F16F 15/12353; F16F 15/1236; F16F 15/134; F16F 15/13469; F16F 15/13476; F16F 15/16; F16F 15/161; F16F 15/167; F16G 55/14; Y10T 74/1987
USPC ....................................................... 464/68.3
See application file for complete search history.

(56) References Cited

U.S. PATENT DOCUMENTS

| | | | | |
|---|---|---|---|---|
| 791,329 | A | * | 5/1905 | Dodge ...................... F16D 3/66 464/66.1 |
| 1,510,943 | A | * | 10/1924 | Kjelsberg .................. F16D 3/66 464/66.1 |
| 4,963,119 | A | | 10/1990 | Graton |
| 5,269,199 | A | * | 12/1993 | Umeyama ............. F16F 15/161 464/68.3 |
| 5,355,747 | A | * | 10/1994 | Kajitani ............ F16F 15/13484 464/68.3 |
| 5,569,086 | A | * | 10/1996 | Fukamachi ........... F16F 15/167 464/68.3 |
| 5,582,076 | A | * | 12/1996 | Hamada ................ F16F 15/161 464/68.3 |
| 5,733,218 | A | * | 3/1998 | Sudau ................. F16F 15/1206 464/68.3 |
| 7,849,990 | B2 | | 12/2010 | Brees et al. |
| 8,562,446 | B2 | * | 10/2013 | Nishitani .......... F16F 15/12353 464/68.1 |
| 2010/0252390 | A1 | | 10/2010 | George |

* cited by examiner

*Primary Examiner* — Josh Skroupa
(74) *Attorney, Agent, or Firm* — Simpson & Simpson, PLLC

(57) ABSTRACT

A power take off (PTO) gear including: an input flange including an outwardly extending protrusion; a ring gear; and a piston including an inwardly extending protrusion and a circumferential end. The PTO gear includes first and second cover plates fixedly secured to the ring gear; at least one elastic element engaged with the flange and the first and second cover plates; and a chamber bounded by the circumferential end of the piston and material forming the ring gear and sealed in first and second axial directions by the first and second cover plates, respectively. For first torque applied to the flange, the flange is arranged to rotate with respect to the ring gear such that: the inwardly and outwardly extending protrusions contacts; the flange displaces the circumferentially curved piston; and the circumferential end of the curved piston displaces fluid disposed in the chamber to dampen motion of the flange.

15 Claims, 7 Drawing Sheets

POWER TAKE OFF GEAR WITH A HYDRAULIC IMPACT DAMPER

CROSS-REFERENCE TO RELATED APPLICATIONS

This application claims the benefit under 35 U.S.C. §119 (e) of U.S. Provisional Patent Application No. 61/749,609, filed Jan. 7, 2013, which application is incorporated herein by reference in its entirety.

TECHNICAL FIELD

The present disclosure relates to power take off gear with hydraulic impact damper, in particular to a power take off gear using fluid cushioning to prevent noise during start-up for a vehicle powering the power take off gear.

BACKGROUND

Typically, a power take off (PTO) gear is designed to transmit engine torque to various accessories, such as a fire truck water pump or a hydraulic cylinder for a dump truck via a transmission. During idling of an engine for a vehicle housing the transmission, angular fluctuations occur between a PTO at the transmission and the PTO gear. The angular fluctuations cause undesirable audible noise in the PTO gear, for example, an input element of the PTO gear oscillates with respect to an output element, such as a ring gear, causing the input element to bang against the output element. Further, during start-up of the engine undesirable noise occurs when the engine and transmission system, including the PTO gear, are in a resonance condition. For example, the input element can contact the output element at a frequency of about 10 Hz.

Commonly owned U.S. Patent Application Publication No. 2010/0252390 discloses a power take off gear using elastic elements to dampen undesirable vibration associated with the idle condition. However, due to the relatively low spring rate for the elastic elements, the elastic elements do not attenuate the resonance condition or prevent the undesirable noise associated with engine start-up.

Bumper springs have been used in systems where a second damper stage is required. Bumper springs become active when a built in degree of travel is reached. Once bumper springs are engaged the first stage springs work in parallel to the bumper springs resulting in higher capacity. Friction control plates have been used in parallel with a spring package to provide friction at large travel angles. Friction control plates are generally axially loaded plates located parallel to the main torque path made of material with durable wear properties such as high carbon steel or Teflon. The axial load is generated by a diaphragm spring. A defined amount of lash is built into the system so that the friction control plates do not engage until a certain travel is reached.

Both bumper springs and friction control plates can require increased amount of axial and radial space in a design. Bumper springs only provide a fully elastic element without impact absorption characteristics. Thus, the springs capture vibration energy in the system instead of absorbing the energy. The effectiveness of friction control plates is limited by the applied axial force and the number of friction surfaces.

SUMMARY

According to aspects illustrated herein, there is provided a power take off gear, including: a flange forming an input for the device and including a radially outwardly extending protrusion; a ring gear; and a circumferentially curved piston including: a radially inwardly extending protrusion; and a circumferential end. The power take off gear includes: first and second cover plates fixedly secured to the ring gear; at least one elastic element engaged with the flange and the first and second cover plates; and a chamber: bounded by the circumferential end of the curved piston and material forming the ring gear; and sealed in first and second axial directions by the first and second cover plates, respectively. For first torque applied to the flange in a rotational direction at a first magnitude, the flange is arranged to rotate with respect to the ring gear in the rotational direction such that: the radially outwardly extending protrusion contacts the radially inwardly extending protrusion; the flange displaces the circumferentially curved piston in the rotational direction; and the circumferential end of the curved piston displaces fluid disposed in the chamber to dampen motion of the flange in the first rotational direction.

According to aspects illustrated herein, there is provided a power take off gear, including: a flange forming an input for the device and including a radially outwardly extending protrusion; a ring gear at least partially rotatable with respect to the flange and including: first and second oppositely facing radial sides; and first and second circumferentially disposed and circumferentially aligned slots. The power take off gear includes a curved piston circumferentially displaceable with respect to the ring gear and including: first and second radially inwardly extending protrusions at least partially circumferentially aligned with the radially outwardly extending protrusion; and first and second circumferential ends disposed in the first and second slots, respectively; at least one elastic element engaged with the flange and the first and second cover plates; and first and second cover plates: fixedly secured to the first and second radial sides, respectively; and sealing the first and second slots in first and second axial directions, respectively. The first slot is bounded radially inwardly and outwardly and at a first circumferential end by material forming the ring gear. The second slot is bounded radially inwardly and outwardly and at a second circumferential end by material forming the ring gear.

According to aspects illustrated herein, there is provided a power take off gear, including a flange forming an input for the device and including a radially outwardly extending protrusion forming a portion of a radially outer circumference of the flange and a ring gear including first and second oppositely facing radial sides and first and second slots: bounded radially inwardly and outwardly by material forming the ring gear; and including first and second openings, respectively, facing each other in a circumferential direction. The power take off gear includes: a curved piston disposed in the first and second openings, respectively and with first and second radially inwardly extending protrusions; first and second cover plates: fixedly secured to the first and second radial sides; sealed to the ring gear at respective radially outer circumferences of the first and second cover plates; and in contact with the curved piston; and at least one elastic element engaged with the flange and the first and second cover plates. The first and second cover plates seal the first and second slots in first and second axial directions, respectively. For first torque applied to the flange in a rotational direction at a first magnitude, the flange is arranged to rotate with respect to the ring gear in the rotational direction such that: the radially outwardly extending protrusion contacts the first radially inwardly extending protrusion; the flange displaces the curved piston in the rotational direction; the first end of the curved piston displaces in the rotational direction in the first slot; and the first end displaces fluid disposed in the first slot, by forcing the fluid between the curved piston and the ring gear, to dampen motion of the flange in the rotational direction. For second torque applied to the flange in the rotational direction and at a second magnitude, greater than the first magnitude, the flange is arranged to rotate with respect to the ring gear in the rotational direction such that: the radially outwardly extending protrusion contacts the ring gear; and the flange displaces the ring gear in the rotational direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
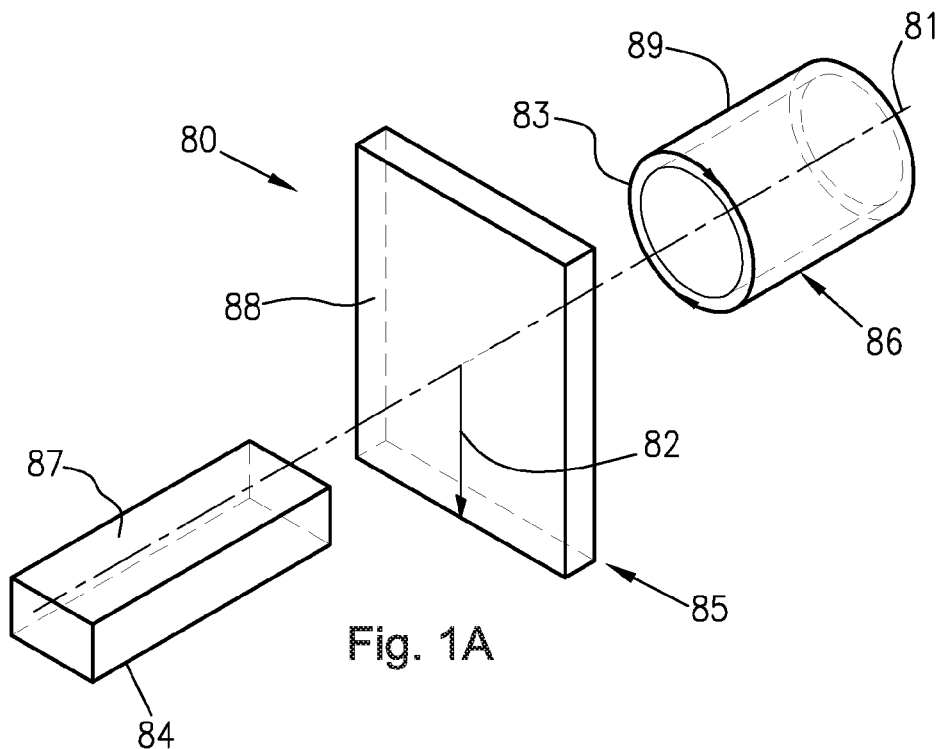
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
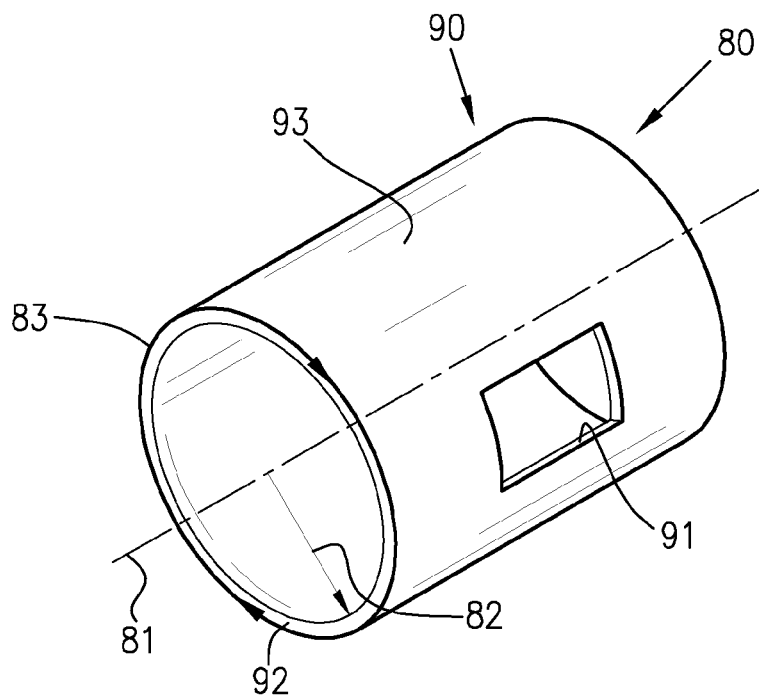
FIG. 1B is a perspective view of an object in the cylindrical coordinate system of FIG. 1A demonstrating spatial terminology used in the present application; and, FIG. 2 is a perspective front view of a power take off gear with a hydraulic impact damper.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
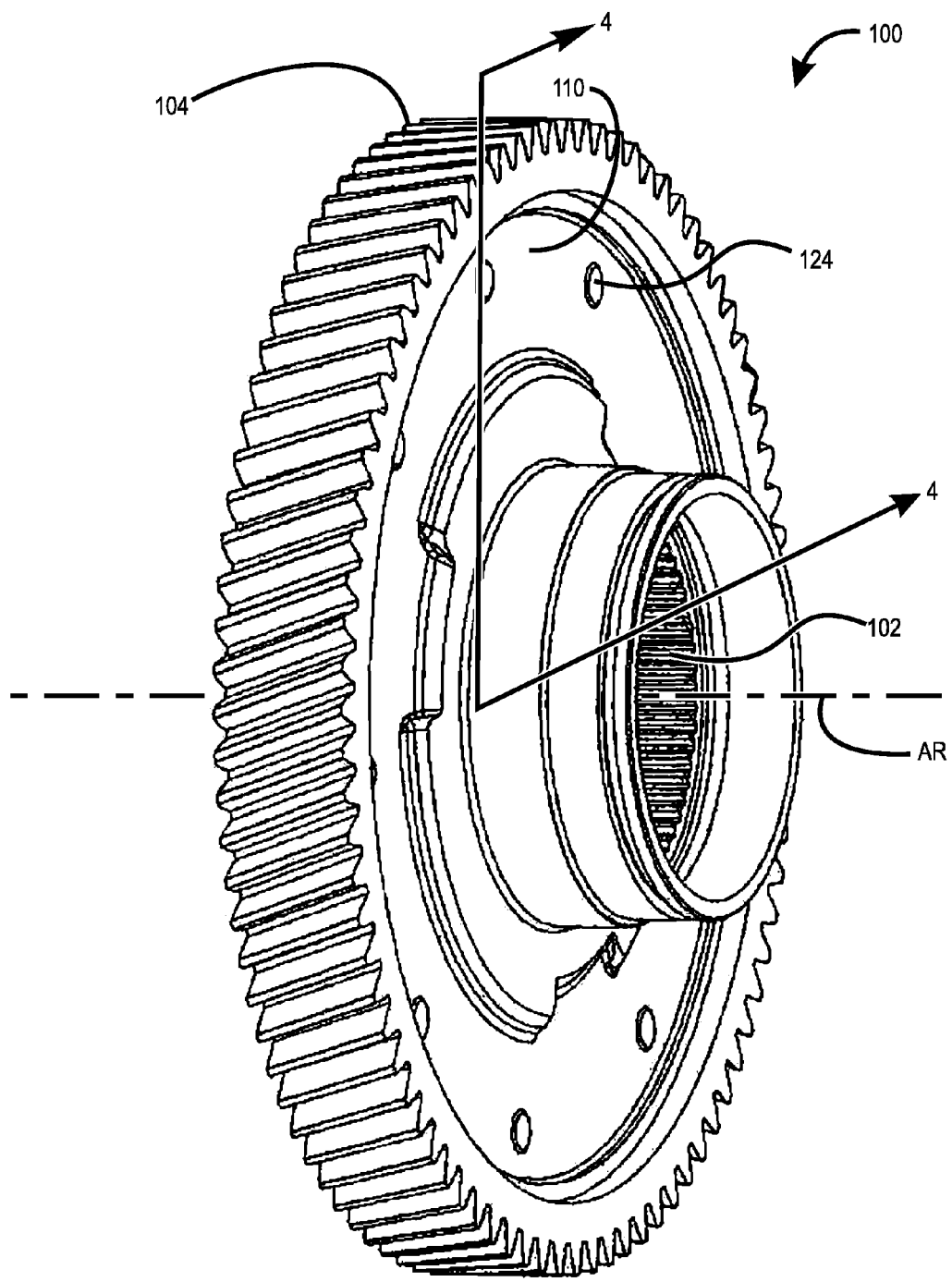

FIG. 2 is a perspective front view of power take off gear 100 in a no-load state with a hydraulic impact damper.

Figure 3:
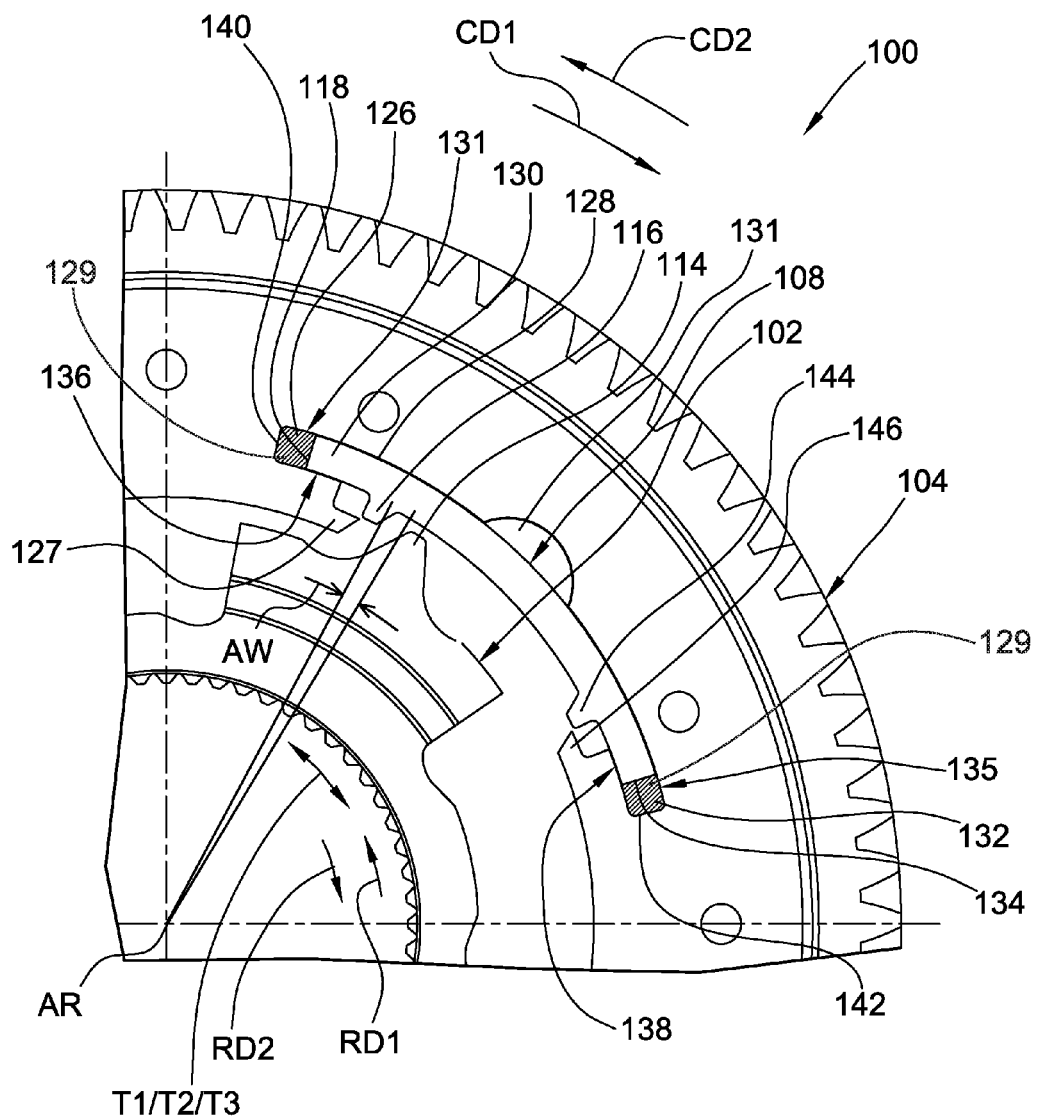
FIG. 3 is a partial front view of a power take off gear in a no-load state with a hydraulic impact damper with a cover plate and elastic elements removed.

FIG. 3 is a partial front view of power take off gear 100 with a hydraulic impact damper with a cover plate and elastic elements removed.

Figure 4:
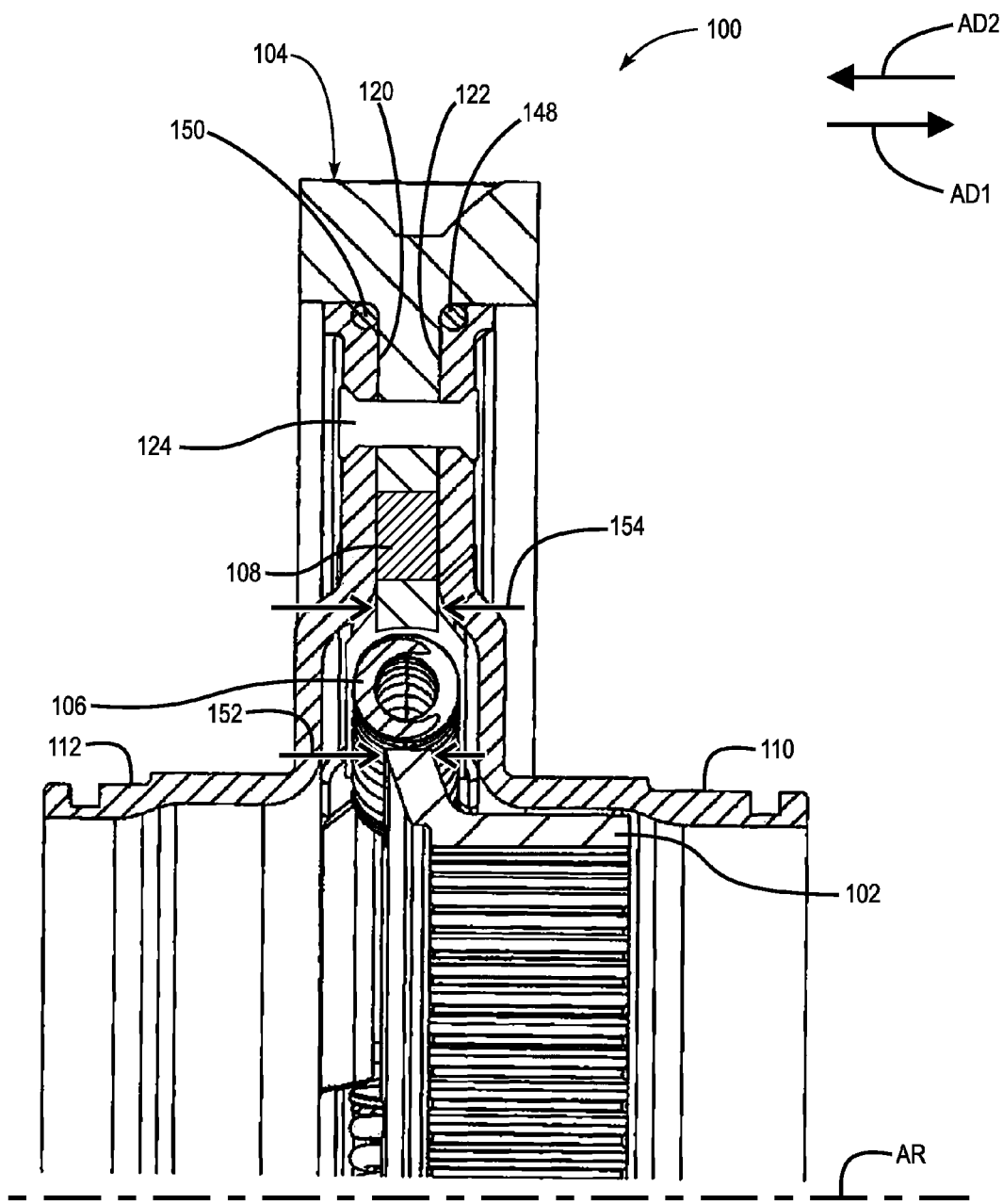
FIG. 4 is a partial cross-sectional view of the power take off gear of FIG. 2.

FIG. 4 is a partial cross-sectional view of power take off gear 100 of FIG. 2 generally along line 4-4 in FIG. 2. The following should be viewed in light of FIGS. 2 through 4. By "no-load state" we mean that the flange described below is either free of a torque load or a torque load is rotationally balanced (equal torque loads in directions RD1 and RD2 described below). Power take off gear 100 includes flange 102, ring gear 104, at least one elastic element 106, curved piston 108, and cover plates 110 and 112. The flange forms an input for the device and includes radially outwardly extending protrusion 114 forming a portion of radially outer circumference of the flange. The at least one elastic element 106 is drivingly engaged with the flange and cover plates 110 and 112. The curved piston includes radially inwardly extending protrusion 116 and circumferential end 118. Cover plates 110 and 112 are fixedly secured to radially disposed sides 120 and 122 of the ring gear by any means known in the art, for example, rivet 124. In an example embodiment, cover plates 110 and 112 are in contact with the curved piston.

As further described below, the ring gear is at least partially rotatable with respect to the flange, for example, about axis of rotation AR for gear 100. As further described below, piston 108 is circumferentially displaceable with respect to the ring gear.

Gear 100 includes chamber 126 bounded by circumferential end 118 and material forming the ring gear. That is, chamber 126 is bounded radially inwardly and outwardly by the ring gear and in circumferential direction CD1 by end 118. Chamber 126 is sealed in axial directions AD1 and AD2 by plates 110 and 112, respectively. Fluid 129, such as hydraulic oil, is disposed in the chamber. For torque T1 applied to the flange in rotational direction RD1 at a first magnitude, the flange is arranged to rotate with respect to the ring gear in direction RD1, for example, by at least partially compressing element 106, such that protrusion 114 contacts protrusion 116. In turn, the flange displaces the curved piston in direction RD1, and end 118 displaces in direction RD1 to displace fluid 129 (indicated by hatched lines) disposed in chamber 126 to dampen motion of the flange in direction RD1. Stated otherwise, the flange is arranged to displace the curved piston in direction RD1 with respect to the ring gear, and end 118 is arranged to displace in direction RD1 with respect to the ring gear to diminish a volume of chamber 126.

For torque T2 applied to the flange in direction RD1 and at a second magnitude, greater than the first magnitude, the flange is arranged to rotate with respect to the ring gear further in direction RD1 such that protrusion 114 contacts the ring gear at contact point 127 and T2 is transmitted to the ring gear in direction RD1. Thus, the flange rotates the ring gear in direction RD1. Gear 100 includes interface 128 of radially outermost portion 130 of the curved piston with the ring gear (the interface is radially between portion 130 and the ring gear). Thus, interface 128 forms a path between portion 130 and the ring gear. In an example embodiment, end 118 is arranged to displace fluid 129 disposed in chamber 126 by displacing fluid 129 through the interface to opening 131.

Chamber 126 is part of slot 131 bounded radially inwardly and outwardly by material forming the ring gear. Gear 100 includes chamber 132 bounded by circumferential end 134 of the piston and the material forming the ring gear. Chamber 132 is part of slot 135 bounded radially inwardly and outwardly by material forming the ring gear. Slots 131 and 135 are circumferentially disposed and circumferentially aligned. Slots 131 and 135 includes openings 136 and 138, respectively, facing each other in circumferential directions CD1 and CD2, respectively. Ends 118 and 134 are disposed in slots 131 and 135, respectively.

Slots 131 and 135 includes circumferential ends 140 and 142, respectively, bounded by the material forming the ring gear. In an example embodiment, when protrusion 114 contacts the ring gear, a respective space is present in slots 131 and 135 between ends 118 and 140 or ends 134 and 142, respectively. That is, ends 118 and 140 do not contact each other, and/or ends 134 and 142 do not contact each other.

The discussion regarding torques T1 and T2 in direction RD1 is applicable to torques T1 and T2 applied to the flange in direction RD2, opposite direction RD1. That is, for torque T1 applied to the flange in a direction RD2, the flange is arranged to rotate with respect to the ring gear in direction RD2 such that protrusion 114 contacts radially inwardly extending protrusion 144 of the curved piston, the flange displaces the curved piston in direction RD2, end 134 displaces in direction RD2 in slot 135, and end 134 displaces fluid 129 disposed in chamber 132 to dampen motion of the flange in direction RD2. For torque T2 applied to the flange in direction RD2, protrusion 114 is arranged to contact the ring gear at contact point 146 to transmit T2 to the ring gear and displace the ring gear in direction RD2.

For torque T3 applied to the flange in direction RD1 or RD2 and below the first magnitude, the flange is arranged to rotate with respect to the ring gear in direction RD1 or RD2 such that element 106 is at least partially compressed and protrusion 114 and protrusions 116 or 144 are separated by respective spaces in a circumferential direction. Thus, lower magnitude torque is "absorbed" by element 106 without expelling fluid 129 from chamber 126 or 132.

In an example embodiment, cover plates 110 and 112 are sealed to the ring gear at respective radially outer circumferences of cover plates 110 and 112, for example, by seals 148 and 150, respectively.

The following provides further detail regarding gear 100. Gear 100 provides an impact damper (piston 108 and chambers 126 and 132) parallel to the spring damper (element 106) while minimizing the number of components and required axial space. The piston is used to displace fluid 129, such as automatic transmission fluid (ATF) and press fluid 129 through channels with a high flow restriction. This pressing of fluid 129 causes a speed dependent reaction torque in the damper assembly.

The piston is engaged by protrusion 114 at a pre-determined wind-up angle, for example angle AW, that is, in the no-load state, protrusions 114 and 116 are circumferentially separated by the wind-up angle. The piston can move in directions RD1 or RD2 guided by centering slots 131 and 135 in the ring gear. The centering slots form chambers, or slots, 126 and 132, in which fluid 129 is disposed and from which fluid 129 is displaced by the piston. Cover plates are, for example, riveted to the ring gear sealing chambers 126 and 132 in axial directions AD1 and AD2. As the piston is moved rotationally, fluid 129 is compressed in one of the chambers. The outer diameters of the slots, for example at interface 128, control the release of the compressed fluid. Further variability can be achieved by adding grooves to the piston that bypass the sealing provided by the clearance. The piston torque is determined by the piston area, piston speed and clearance around the piston surface (size of the interface). For example, for T2 in direction RD1, chamber 126 creates torque due to reduction of the volume and expelling of fluid 129, chamber 132 creates torque by increasing the volume of transmission fluid in chamber 132 as end 134 rotates in direction RD1.

The flange and protrusion 114 must overcome the spring damper force from element 106 before protrusion 114 comes in contact with protrusion 116 or 144. After contact, as protrusion 114 continues to rotate, protrusion 114 forces rotation of the piston via protrusion 116 until protrusion 114 comes in contact with one of the contact points of the ring gear. In an example embodiment, axial width 152 of the flange is less than axial width 154 of the ring gear in the region including slots 131 and 135.

In FIG. 3, protrusion 114 is considerably closer to protrusion 116 than to protrusion 144. Thus, dampening would occur with less rotation of the flange in direction RD1 than in direction RD2. It should be understood that the preceding configuration can be reversed, such that protrusion 114 is closer to protrusion 144 than to protrusion 116. It also should be understood that both of the preceding configurations can be included in gear 100 in any ratio, including an equal ratio, to provide dampening in both rotational directions.

Figure 5:
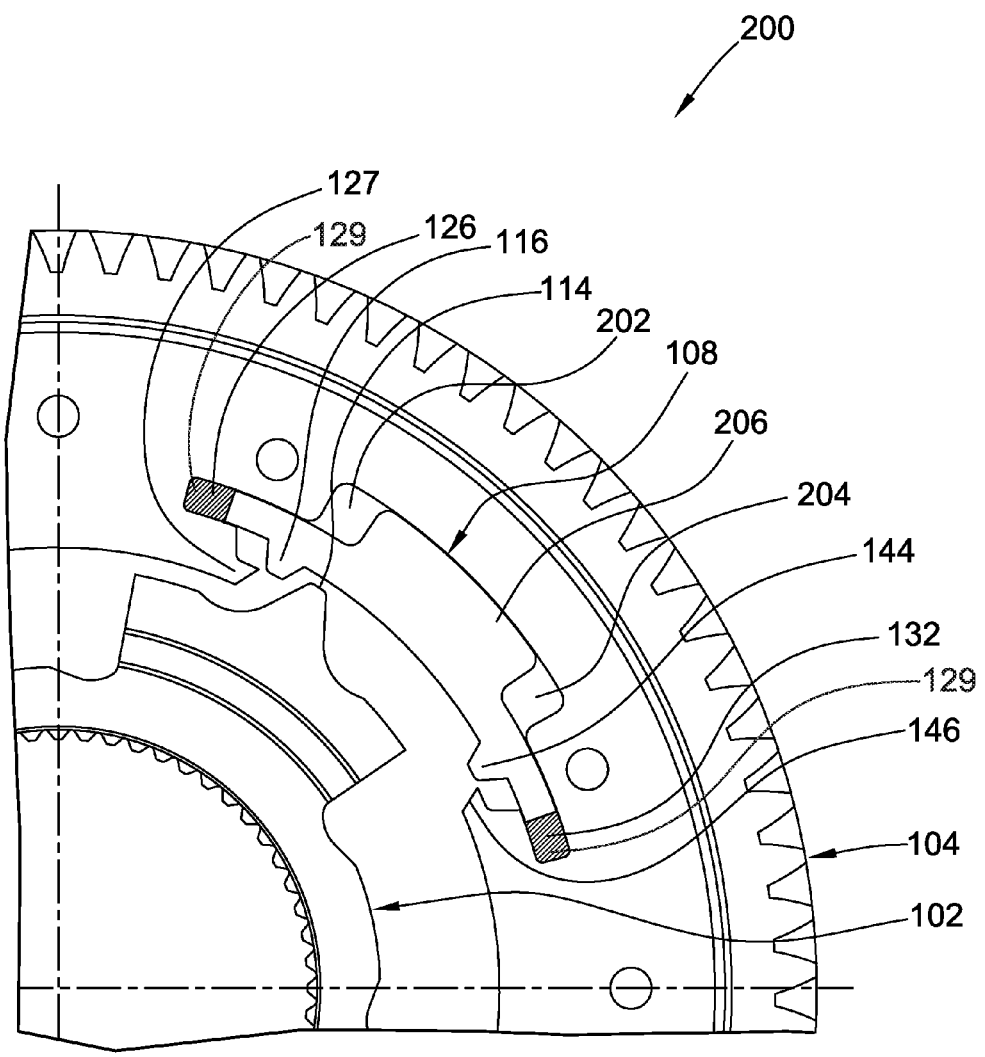
FIG. 5 is a partial front view of a power take off gear in a no-load state with a hydraulic impact damper with a cover plate and elastic elements removed.

FIG. 5 is a partial front view of power take off gear 200 in a no-load state with a hydraulic impact damper with a cover plate and elastic elements removed. The description for gear 100 in FIGS. 2 through 4 is applicable to gear 200 and FIG. 5 except as noted below. In FIG. 5, the number of chambers containing fluid 129 is increased. Specifically, chambers 202 and 204, bounded by the material forming the ring gear and piston 108 including portion 206, are added. The addition of chambers 202 and 204 provides increased dampening (attenuates higher torque levels) due to the increased volume of fluid 129 that is compressed and expelled by the piston as the piston is rotated in directions RD1 or RD2 by torque on the flange.

Figure 6:
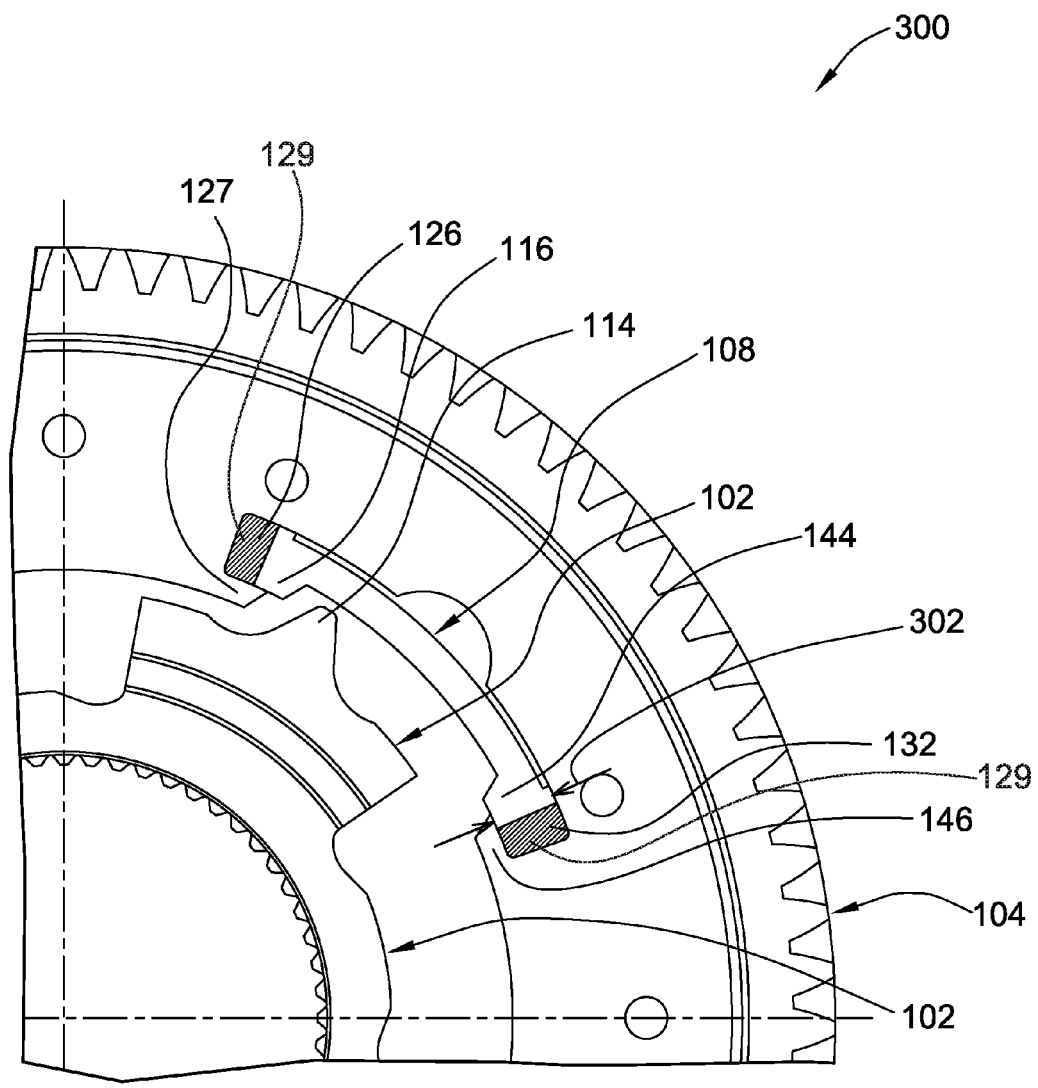
FIG. 6 is a partial front view of a power take off gear in a no-load state with a hydraulic impact damper with a cover plate and elastic elements removed; and, FIG. 7 is a partial front view of a power take off gear in a no-load state with a hydraulic impact damper with a cover plate and elastic elements removed.

FIG. 6 is a partial front view of power take off gear 300 in a no-load state with a hydraulic impact damper with a cover plate and elastic elements removed.

Figure 7:
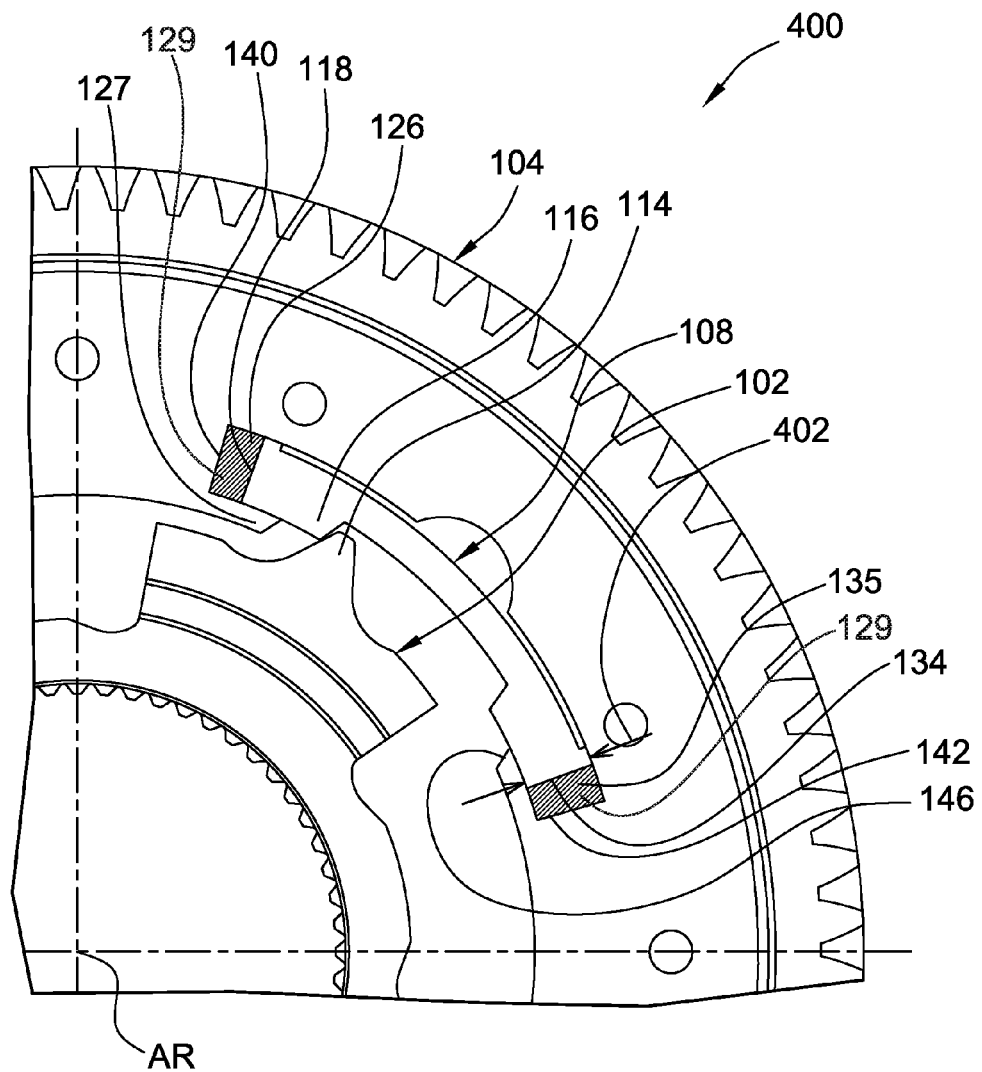

FIG. 7 is a partial front view of power take off gear 400 in a no-load state with a hydraulic impact damper with a cover plate and elastic elements removed. The description for gear 100 in FIGS. 2 through 4 is applicable to gears 300 and 400, and FIGS. 6 and 7, respectively, except as noted below. In FIGS. 6 and 7, the respective piston areas are increased, that is radial extents 302 and 402 of pistons 108 in gears 300 and 400, respectively, are increased, which provides increased dampening due to the increased volume that is compressed and the increased size of the pathway through which fluid 129 is expelled from chambers 126 and 132.

In FIG. 7, the wind-up angle (for example, circumferential space between protrusions 114 and 116 in direction RD1 during the no-load state) is reduced as compared to the wind-up angle for gear 100. For example, in FIG. 7, the wind-up angle is reduced to zero such that protrusions 114 and 116 are in contact. Thus, protrusion 114 contacts protrusion 116 after less rotation of the flange, enabling dampening by the piston to engage earlier and increasing the amount of movement of the piston in slots 131 and 135. The increase in dampening capability of gears 300 and 400 is particularly advantageous for higher capacity (higher torque load) applications.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A power take off gear, comprising:
   a flange forming an input for the power take off gear and including a radially outwardly extending protrusion;
   a ring gear;
   a circumferentially curved piston including:
      a radially inwardly extending protrusion; and,
      a circumferential end;
   first and second cover plates fixedly secured to the ring gear;
   at least one elastic element engaged with the flange and the first and second cover plates; and,
   a chamber:
      bounded by the circumferential end of the curved piston and material forming the ring gear; and,
      sealed in first and second axial directions by the first and second cover plates, respectively, wherein for first torque applied to the flange in a rotational direction at a first magnitude, the flange is arranged to rotate with respect to the ring gear in the rotational direction such that:
      the radially outwardly extending protrusion contacts the radially inwardly extending protrusion;
      the flange displaces the circumferentially curved piston in the rotational direction; and,
      the circumferential end of the curved piston displaces fluid disposed in the chamber to dampen the rotation of the flange in the first rotational direction.

2. The power take off gear of claim 1, wherein for second torque applied to the flange in the rotational direction and at a second magnitude, greater than the first magnitude, the flange is arranged to rotate with respect to the ring gear in the rotational direction such that:
   the radially outwardly extending protrusion contacts the ring gear; and,
   the second torque is transmitted to the ring gear in the rotational direction.

3. The power take off gear of claim 1, wherein the first and second cover plates are in contact with the circumferentially curved piston.

4. The power take off gear of claim 1, further comprising an interface of a radially outermost portion of the circumferentially curved piston with the ring gear and wherein the circumferential end of the circumferentially curved piston is arranged to displace the fluid in the chamber through the interface.

5. The power take off gear of claim 1, wherein for the first torque applied to the flange in the rotational direction at the first magnitude, the circumferential end of the circumferentially curved piston is arranged to displace in the rotational direction with respect to the ring gear to reduce a volume of the first space.

6. A power take off gear, comprising:
   a flange forming an input for the power take off gear and including a radially outwardly extending protrusion;
   a ring gear at least partially rotatable with respect to the flange and including:
      first and second oppositely facing radial sides; and,
      first and second circumferentially disposed and circumferentially aligned slots;
   a curved piston circumferentially displaceable with respect to the ring gear and including:
      first and second radially inwardly extending protrusions at least partially circumferentially aligned with the radially outwardly extending protrusion; and,
      first and second circumferential ends disposed in the first and second slots, respectively;
   at least one elastic element engaged with the flange and the first and second cover plates; and,
   first and second cover plates:
      fixedly secured to the first and second radial sides, respectively; and,
      sealing the first and second slots in first and second axial directions, respectively, wherein:
   the first slot is bounded radially inwardly and outwardly and at a first circumferential end by material forming the ring gear; and,
   the second slot is bounded radially inwardly and outwardly and at a second circumferential end by material forming the ring gear.

7. The power take off gear of claim 6, wherein:
   for first torque applied to the flange in a first rotational direction at a first magnitude, the flange is arranged to rotate with respect to the ring gear in the first rotational direction such that:
      the radially outwardly extending protrusion contacts the first radially inwardly extending protrusion;
      the flange displaces the curved piston in the first rotational direction;
      the first end of the curved piston displaces in the first rotational direction in the first slot; and,
      the first end displaces fluid disposed in the first slot to dampen motion of the flange in the first rotational direction.

8. The power take off gear of claim 6, wherein:
   for second torque applied to the flange in the first rotational direction and at a second magnitude, greater than the first magnitude, the flange is arranged to rotate with respect to the ring gear in the first rotational direction such that:
      the radially outwardly extending protrusion contacts the ring gear; and,
      the second torque is transmitted to the ring gear in the first rotational direction.

9. The power take off gear of claim 8, wherein when the radially outwardly extending protrusion contacts the ring gear, a space is present in the first slot between the first circumferential end of the curved piston and the first circumferential end of the slot.

10. The power take off gear of claim 6, wherein the first circumferential end of the piston is arranged to displace the fluid disposed in the first slot by forcing the fluid along a path radially disposed between the curved piston and the ring gear.

11. The power take off gear of claim 6, wherein for torque applied to the flange in the first rotational direction and below the first magnitude, the flange is arranged to rotate with respect to the ring gear in the first rotational direction such that:
   the at least one elastic element is at least partially compressed; and,
   the radially outwardly extending protrusion and the first radially inwardly extending protrusion are separated by a space in a circumferential direction.

12. The power take off gear of claim 6, wherein for torque applied to the flange in a second rotational direction, opposite the first rotational direction, and at the first magnitude, the flange is arranged to rotate with respect to the ring gear in the second rotational direction such that:
   the radially outwardly extending protrusion contacts the second radially inwardly extending protrusion;
   the flange displaces the curved piston in the second rotational direction;
   the second end of the curved piston displaces in the second rotational direction in the second slot; and,
   the second end displaces the fluid disposed in the second slot to dampen motion of the flange in the second rotational direction.

13. The power take off gear of claim 6, wherein the first and second cover plates are in contact with the curved piston.

14. The power take off gear of claim 6, wherein the first and second cover plates are sealed to the ring gear at respective radially outer circumferences of the first and second cover plates.

15. A power take off gear, comprising:
   a flange forming an input for the power take off gear and including a radially outwardly extending protrusion forming a portion of a radially outer circumference of the flange;
   a ring gear including:
      first and second oppositely facing radial sides; and,
      first and second slots:
         bounded radially inwardly and outwardly by material forming the ring gear; and,
         including first and second openings, respectively, facing each other in a circumferential direction;
   a curved piston disposed in the first and second openings, respectively and with first and second radially inwardly extending protrusions;
   first and second cover plates:
      fixedly secured to the first and second radial sides;
      sealed to the ring gear at respective radially outer circumferences of the first and second cover plates; and,
      in contact with the curved piston; and,
   at least one elastic element engaged with the flange and the first and second cover plates, wherein:
      the first and second cover plates seal the first and second slots in first and second axial directions, respectively;
      for first torque applied to the flange in a rotational direction at a first magnitude, the flange is arranged to rotate with respect to the ring gear in the rotational direction such that:
         the radially outwardly extending protrusion contacts the first radially inwardly extending protrusion;
         the flange displaces the curved piston in the rotational direction;
         the first end of the curved piston displaces in the rotational direction in the first slot; and,
         the first end displaces fluid disposed in the first slot, by forcing the fluid between the curved piston and the ring gear, to dampen motion of the flange in the rotational direction; and,
      for second torque applied to the flange in the rotational direction and at a second magnitude, greater than the first magnitude, the flange is arranged to rotate with respect to the ring gear in the rotational direction such that:
         the radially outwardly extending protrusion contacts the ring gear; and,
         the flange displaces the ring gear in the rotational direction.

\* \* \* \* \*